J. PEDDER & G. ABEL.
FORK BLANK-BAR.
No. 173,236.  Patented Feb. 8, 1876.
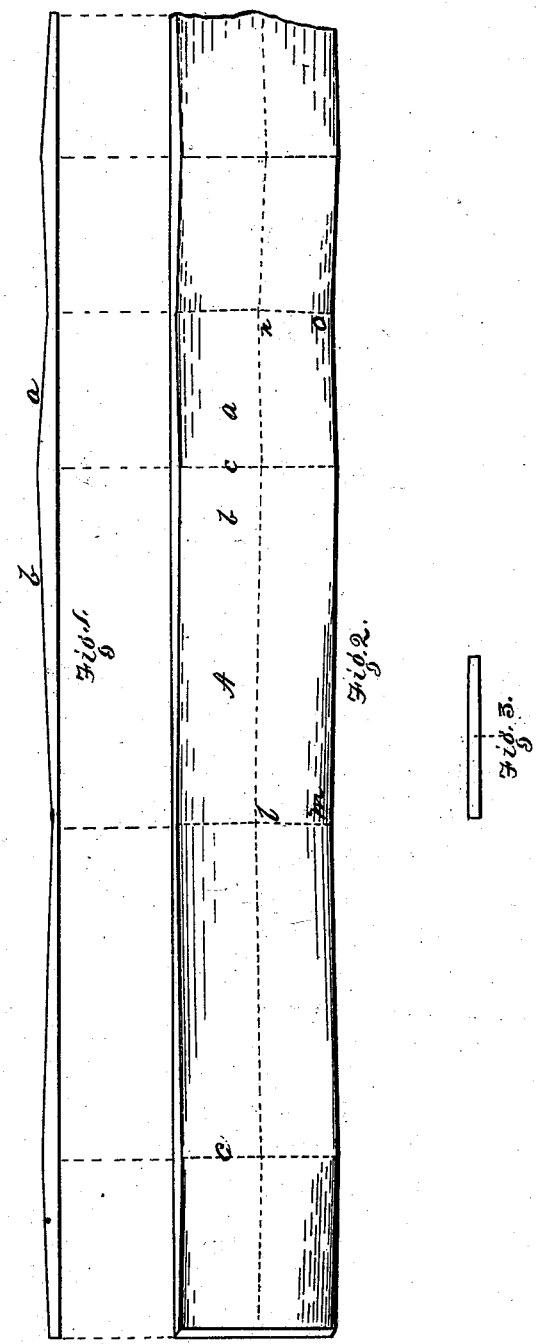

UNITED STATES PATENT OFFICE.

JOHN PEDDER AND GEORGE ABEL, OF BEAVER FALLS, PENNSYLVANIA.

IMPROVEMENT IN FORK-BLANK BARS.

Specification forming part of Letters Patent No. 173,236, dated February 8, 1876; application filed December 18, 1875.

*To all whom it may concern:*

Be it known that we, JOHN PEDDER and GEORGE ABEL, of Beaver Falls, in the county of Beaver and State of Pennsylvania, have invented a new and useful Improvement in Manufacture of Fork-Blanks; and we do hereby declare the following to be a full, clear, and exact description thereof, reference being had to the accompanying drawing, forming a part of this specification, in which—

Figure 1 is a side or edge view of a skelp or bar embodying our invention. Fig. 2 is a perspective view, and Fig. 3 an end view, of the same.

Like letters refer to like parts wherever they occur.

Our invention relates to the manufacture of table cutlery and similar articles.

Heretofore in the production of fork-blanks two methods have been followed, the first being to forge the blanks separately, which involved loss of time, increased labor, and much expense; the second consisting in rolling a bar having two inclines extending the length of the bar, one narrow for the tang, the other wide enough for the length of tine to be made, and cutting such a bar transversely into blanks of the required width, this latter method being objectionable on account of the great difficulty experienced in rolling the bar, and the necessity of cutting across the fiber of the material.

The object of the present invention is to avoid the labor, and consequent expense, of forging the blanks, as well as the necessity of working across the grain of the former rolled blanks.

We will now proceed to describe our invention, so that others skilled in the art to which it appertains may apply the same.

In the drawing, A represents a skelp or bar, one face of which may be flat, as shown, but the opposite face is composed of a series of inclines, $a$ $b$, of unequal lengths, the shorter inclines $a$ corresponding in length to the tang of the article to be produced, and the longer inclines $b$ to the tines of the fork. A long and short incline, meeting at the point $c$, compose a blank, the point $c$ corresponding to the junction of tang and tine.

A bar or skelp of the form specified can be readily produced by grooved rolls, and in the usual manner, the circumference of the rolls being multiples of the blank to be made from the bar.

Having obtained the bar specified it is submitted to suitable dies, which strike out the fork-blank for each space thereof corresponding to that inclosed by the letters $l$ $m$ $n$ $o$, and the blank may then be finished up in the usual manner.

It is essential that one face of the bar may be as specified; but the other may be made up of inclines, or be flat, as preferred.

The advantages of our present invention are, that we are enabled to produce a fork-blank in which the grain or fiber of the metal runs in the same direction as the tang and tine of the finished fork, and, therefore, one having all the advantages of the forged article, and at the same time we avoid the labor, expense, and loss of time attendant upon the manufacture of forged blanks.

Having thus described our invention, what we claim, and desire to secure by Letters Patent, is—

The bar or double series of fork-blanks herein described, the same consisting of a double line of blanks, joined longitudinally, and end to end, each blank having a long longitudinal incline for the tine portion, and a short longitudinal incline for the tang, substantially as specified.

In testimony whereof we, the said JOHN PEDDER and GEORGE ABEL, have hereunto set our hands.

JOHN PEDDER.
GEORGE ABEL.

Witnesses:
A. E. BRUCE,
C. P. WALLACE.